US012013311B2

(12) United States Patent
Gillot

(10) Patent No.: US 12,013,311 B2
(45) Date of Patent: Jun. 18, 2024

(54) METHOD FOR DETECTING MALFUNCTIONING TURBO-DIESEL CYLINDERS

(71) Applicant: DAF Trucks N.V., Eindhoven (NL)

(72) Inventor: Jan Klaas Bernard Gillot, Heeze (NL)

(73) Assignee: DAF Trucks N.V., Eindhoven (NL)

( * ) Notice: Subject to any disclaimer, the term of this patent is extended or adjusted under 35 U.S.C. 154(b) by 0 days.

(21) Appl. No.: 18/254,797

(22) PCT Filed: Dec. 1, 2021

(86) PCT No.: PCT/NL2021/050728
§ 371 (c)(1),
(2) Date: May 26, 2023

(87) PCT Pub. No.: WO2022/119441
PCT Pub. Date: Jun. 9, 2022

(65) Prior Publication Data
US 2024/0102888 A1 Mar. 28, 2024

(30) Foreign Application Priority Data

Dec. 3, 2020 (NL) ...................................... 2027035

(51) Int. Cl.
| | |
|---|---|
| *G01M 15/05* | (2006.01) |
| *F02D 41/00* | (2006.01) |
| *F02D 41/20* | (2006.01) |

(52) U.S. Cl.
CPC ........... *G01M 15/05* (2013.01); *F02D 41/009* (2013.01); *F02D 41/20* (2013.01); *F02D 2200/101* (2013.01)

(58) Field of Classification Search
CPC ........ F02D 41/00; F02D 41/009; F02D 41/14; F02D 41/20; G01M 15/05; G01M 15/06; G01M 15/10; G01M 15/11
See application file for complete search history.

(56) References Cited

U.S. PATENT DOCUMENTS

| | | | |
|---|---|---|---|
| 7,899,608 B1* | 3/2011 | Pederson | G01M 15/11 701/111 |
| 2002/0129799 A1* | 9/2002 | Wang | F02M 26/49 73/114.76 |

(Continued)

FOREIGN PATENT DOCUMENTS

| | | |
|---|---|---|
| EP | 0716298 A2 | 6/1996 |
| WO | 2019088839 A1 | 5/2019 |

OTHER PUBLICATIONS

Nternational Search Report and Written Opinion—PCT/NL2021/050728—mailing date Jun. 9, 2022.

*Primary Examiner* — Logan M Kraft
*Assistant Examiner* — Johnny H Hoang
(74) *Attorney, Agent, or Firm* — Banner & Witcoff, Ltd.

(57) ABSTRACT

According to the invention, a diagnostic method is provided for diagnosing a misfire condition of individual engine cylinders in a turbocharged diesel engine having at least a first and a second cylinder. The diagnostic method is characterized by defining a group of diagnosing functions (f1 . . . fn), each having as inputs a number of subsequent sampling pressure values (p1 . . . pm) and having as output a threshold characteristic (t1 . . . tn) diagnosing a misfire condition; determining an error function (e1 . . . en), which is a function of measured false fails and false passes for said diagnosed misfire condition by said diagnosing function (f1 . . . fn), in each of an engine speed region, ranging from a lowest engine speed (rlow) to a highest engine speed (rhigh), for selected engine speed range intervals (s1 . . . sl), and selecting a diagnosing function fi from the group of diagnosing functions (f1 . . . fn), where in fi having an error function ei that is lowest over the entire speed range ([rlow-rhigh]). The number n of diagnosing functions (f1 . . . fn) in the group of diagnosing functions can be more than 7.

24 Claims, 14 Drawing Sheets

(56) References Cited

U.S. PATENT DOCUMENTS

| | | | |
|---|---|---|---|
| 2006/0207526 A1* | 9/2006 | Kassner | F02P 5/1516 |
| | | | 123/1 R |
| 2013/0283782 A1* | 10/2013 | McConville | F02D 41/0007 |
| | | | 60/602 |
| 2016/0333807 A1* | 11/2016 | Pathan | G01M 15/11 |
| 2019/0040805 A1* | 2/2019 | Barta | G01M 15/11 |
| 2021/0063280 A1* | 3/2021 | Shurkewitsch | F02D 41/1448 |

\* cited by examiner

FIG. 11

| Class combination number | Total Cross Validation error Engine speed [rpm] | | | | | | | | | | | | | |
|---|---|---|---|---|---|---|---|---|---|---|---|---|---|---|
| | 600 | 700 | 800 | 900 | 1000 | 1100 | 1200 | 1300 | 1400 | 1500 | 1600 | 1700 | 1800 | |
| 1 | #### | #### | #### | #### | 81007 | #### | 92250 | #### | 1E+05 | #### | 1E+05 | #### | 93558 | 1132672 |
| 2 | 417 | 1135 | 1586 | 1185 | 372 | 293 | 171 | 163 | 226 | 159 | 202 | 728 | 462 | 7099 |
| 3 | #### | #### | #### | #### | 57522 | #### | 72412 | #### | 72661 | #### | 57068 | #### | 49060 | 744789 |
| 4 | #### | #### | #### | #### | 54731 | #### | 42908 | #### | 51897 | #### | 41329 | #### | 37981 | 557734 |
| 5 | 533 | 3450 | 3002 | 1163 | 531 | 270 | 285 | 195 | 255 | 199 | 211 | 773 | 185 | 11052 |
| 6 | 400 | 1456 | 1871 | 1592 | 614 | 227 | 174 | 151 | 185 | 145 | 166 | 304 | 168 | 7453 |
| 7 | 214 | 377 | 540 | 474 | 130 | 105 | 96 | 100 | 130 | 107 | 145 | 66 | 41 | 2525 |
| 8 | 247 | 602 | 733 | 578 | 221 | 193 | 141 | 136 | 190 | 153 | 178 | 318 | 150 | 3840 |
| 9 | 239 | 661 | 865 | 594 | 147 | 108 | 100 | 105 | 201 | 158 | 180 | 471 | 147 | 3976 |
| 10 | 274 | 566 | 655 | 474 | 220 | 128 | 98 | 108 | 165 | 137 | 159 | 110 | 63 | 3157 |
| 11 | 199 | 514 | 465 | 308 | 124 | 109 | 98 | 104 | 157 | 134 | 152 | 77 | 40 | 2481 |
| 12 | 191 | 496 | 618 | 410 | 130 | 122 | 102 | 113 | 152 | 129 | 144 | 63 | 46 | 2716 |
| 13 | 180 | 341 | 346 | 253 | 114 | 100 | 78 | 95 | 129 | 111 | 139 | 55 | 28 | 1969 |
| 14 | 226 | 539 | 844 | 585 | 165 | 127 | 117 | 126 | 168 | 132 | 169 | 428 | 205 | 3831 |
| 15 | 208 | 346 | 323 | 345 | 162 | 125 | 109 | 127 | 163 | 126 | 166 | 299 | 119 | 2618 |
| 16 | 174 | 284 | 333 | 350 | 110 | 95 | 85 | 99 | 135 | 111 | 143 | 67 | 40 | 2026 |
| 17 | 169 | 318 | 358 | 389 | 106 | 97 | 84 | 95 | 122 | 105 | 140 | 58 | 33 | 2074 |
| 18 | 148 | 226 | 325 | 300 | 92 | 79 | 74 | 88 | 117 | 93 | 132 | 53 | 31 | 1758 |
| 19 | 194 | 784 | 494 | 248 | 131 | 113 | 93 | 102 | 137 | 122 | 145 | 67 | 32 | 2662 |
| 20 | 233 | 417 | 475 | 385 | 152 | 160 | 129 | 144 | 175 | 142 | 150 | 91 | 44 | 2697 |
| 21 | 196 | 494 | 683 | 405 | 116 | 109 | 83 | 105 | 150 | 117 | 143 | 67 | 47 | 2715 |
| 22 | 171 | 320 | 322 | 252 | 111 | 97 | 79 | 94 | 124 | 99 | 132 | 52 | 29 | 1882 |
| 23 | 208 | 456 | 450 | 284 | 141 | 134 | 109 | 121 | 166 | 139 | 150 | 113 | 33 | 2504 |
| 24 | 210 | 615 | 738 | 537 | 191 | 124 | 86 | 104 | 145 | 110 | 139 | 48 | 39 | 3086 |
| 25 | 162 | 240 | 274 | 236 | 106 | 94 | 78 | 90 | 121 | 96 | 128 | 42 | 28 | 1695 |
| 26 | 170 | 373 | 388 | 259 | 104 | 88 | 80 | 97 | 134 | 106 | 134 | 50 | 33 | 2016 |
| 27 | 153 | 211 | 259 | 219 | 100 | 83 | 74 | 87 | 121 | 95 | 130 | 45 | 27 | 1604 |
| 28 | 152 | 231 | 264 | 214 | 97 | 81 | 71 | 87 | 117 | 92 | 127 | 44 | 29 | 1606 |

Cross validation False Fail error

| | | Engine speed [rpm] | | | | | | | | | | | | |
|---|---|---|---|---|---|---|---|---|---|---|---|---|---|---|
| | 600 | 700 | 800 | 900 | 1000 | 1100 | 1200 | 1300 | 1400 | 1500 | 1600 | 1700 | 1800 |
| 1 | 3327 | 790 | 0 | 0 | 4 | 15 | 4017 | 4301 | 5978 | #### | #### | #### | #### |
| 2 | 144 | 398 | 516 | 447 | 177 | 165 | 96 | 59 | 91 | 53 | 56 | 335 | 310 |
| 3 | 982 | 6169 | ### | ### | 8654 | #### | #### | #### | 1268 | 2370 | 2472 | 2919 | 6640 |
| 4 | 3921 | #### | #### | #### | #### | #### | #### | #### | #### | #### | #### | #### | #### |
| 5 | 133 | 773 | 867 | 430 | 205 | 108 | 101 | 60 | 92 | 49 | 28 | 98 | 33 |
| 6 | 195 | 496 | 714 | 671 | 249 | 100 | 109 | 55 | 50 | 46 | 35 | 125 | 41 |
| 7 | 44 | 119 | 221 | 189 | 35 | 31 | 28 | 15 | 24 | 13 | 14 | 10 | 6 |
| 8 | 65 | 167 | 323 | 135 | 62 | 68 | 76 | 39 | 59 | 44 | 38 | 164 | 64 |
| 9 | 61 | 271 | 257 | 202 | 47 | 32 | 33 | 18 | 57 | 39 | 27 | 242 | 61 |
| 10 | 82 | 176 | 278 | 148 | 86 | 40 | 38 | 20 | 33 | 30 | 22 | 43 | 22 |
| 11 | 38 | 160 | 148 | 82 | 35 | 28 | 30 | 14 | 22 | 19 | 2 | 12 | 7 |
| 12 | 53 | 158 | 187 | 115 | 34 | 49 | 31 | 23 | 22 | 32 | 14 | 14 | 13 |
| 13 | 31 | 107 | 138 | 52 | 21 | 25 | 16 | 10 | 19 | 8 | 8 | 7 | 3 |
| 14 | 70 | 169 | 364 | 160 | 53 | 26 | 55 | 22 | 40 | 27 | 28 | 160 | 75 |
| 15 | 46 | 144 | 170 | 168 | 36 | 29 | 46 | 23 | 36 | 36 | 32 | 166 | 39 |
| 16 | 39 | 118 | 134 | 119 | 17 | 35 | 16 | 14 | 8 | 19 | 9 | 10 | 9 |
| 17 | 37 | 136 | 173 | 126 | 16 | 29 | 21 | 10 | 16 | 7 | 12 | 7 | 9 |
| 18 | 23 | 93 | 142 | 114 | 14 | 25 | 16 | 8 | 15 | 4 | 5 | 7 | 7 |
| 19 | 40 | 247 | 180 | 59 | 25 | 23 | 21 | 14 | 21 | 16 | 5 | 9 | 6 |
| 20 | 55 | 141 | 154 | 113 | 37 | 56 | 41 | 23 | 24 | 32 | 8 | 18 | 11 |
| 21 | 47 | 149 | 227 | 129 | 23 | 31 | 30 | 18 | 28 | 18 | 16 | 17 | 15 |
| 22 | 24 | 94 | 102 | 60 | 20 | 23 | 17 | 10 | 22 | 8 | 6 | 5 | 4 |
| 23 | 43 | 180 | 96 | 72 | 33 | 38 | 28 | 29 | 22 | 18 | 3 | 29 | 4 |
| 24 | 63 | 256 | 308 | 208 | 65 | 44 | 23 | 18 | 27 | 10 | 11 | 4 | 13 |
| 25 | 25 | 83 | 108 | 68 | 23 | 30 | 20 | 6 | 19 | 6 | 1 | 4 | 3 |
| 26 | 35 | 146 | 145 | 76 | 23 | 25 | 21 | 16 | 8 | 14 | 5 | 6 | 3 |
| 27 | 29 | 100 | 113 | 72 | 18 | 21 | 17 | 14 | 15 | 7 | 4 | 2 | 3 |
| 28 | 29 | 89 | 123 | 62 | 20 | 25 | 14 | 6 | 15 | 3 | 1 | 3 | 3 |

Cross validation False Pass error

| | | Engine speed [rpm] | | | | | | | | | | | | |
|---|---|---|---|---|---|---|---|---|---|---|---|---|---|---|
| | 600 | 700 | 800 | 900 | 1000 | 1100 | 1200 | 1300 | 1400 | 1500 | 1600 | 1700 | 1800 |
| 1 | #### | #### | #### | #### | #### | #### | #### | #### | #### | #### | #### | #### | #### |
| 2 | 273 | 737 | #### | 738 | 195 | 128 | 75 | 104 | 135 | 106 | 146 | 393 | 152 |
| 3 | #### | #### | #### | #### | #### | #### | #### | #### | #### | #### | #### | #### | #### |
| 4 | 8024 | #### | #### | #### | #### | #### | #### | #### | #### | #### | #### | #### | #### |
| 5 | 400 | 2677 | #### | 733 | 326 | 162 | 184 | 135 | 163 | 150 | 183 | 675 | 152 |
| 6 | 205 | 960 | #### | 921 | 365 | 127 | 65 | 96 | 135 | 99 | 131 | 179 | 127 |
| 7 | 170 | 258 | 319 | 285 | 95 | 74 | 68 | 85 | 106 | 94 | 131 | 56 | 35 |
| 8 | 182 | 435 | 410 | 443 | 159 | 125 | 65 | 97 | 131 | 109 | 140 | 154 | 86 |
| 9 | 178 | 390 | 608 | 392 | 100 | 76 | 67 | 87 | 144 | 119 | 153 | 229 | 86 |
| 10 | 192 | 390 | 377 | 326 | 134 | 88 | 60 | 88 | 132 | 107 | 137 | 67 | 41 |
| 11 | 161 | 354 | 317 | 226 | 89 | 81 | 68 | 90 | 135 | 115 | 150 | 65 | 33 |
| 12 | 138 | 338 | 431 | 295 | 96 | 73 | 71 | 90 | 130 | 97 | 130 | 49 | 33 |
| 13 | 149 | 234 | 208 | 201 | 93 | 75 | 62 | 85 | 110 | 103 | 131 | 48 | 25 |
| 14 | 156 | 370 | 480 | 425 | 112 | 101 | 62 | 104 | 128 | 105 | 141 | 268 | 130 |
| 15 | 162 | 202 | 153 | 177 | 126 | 96 | 63 | 104 | 127 | 90 | 134 | 133 | 80 |
| 16 | 135 | 166 | 199 | 231 | 93 | 60 | 69 | 85 | 127 | 92 | 134 | 57 | 31 |
| 17 | 132 | 182 | 185 | 263 | 90 | 68 | 63 | 85 | 106 | 98 | 128 | 51 | 24 |
| 18 | 125 | 133 | 183 | 186 | 78 | 54 | 58 | 80 | 102 | 89 | 127 | 46 | 24 |
| 19 | 154 | 537 | 314 | 189 | 106 | 90 | 72 | 88 | 116 | 106 | 140 | 58 | 26 |
| 20 | 178 | 276 | 321 | 272 | 115 | 104 | 88 | 121 | 151 | 110 | 142 | 73 | 33 |
| 21 | 149 | 345 | 456 | 276 | 93 | 78 | 53 | 87 | 122 | 99 | 127 | 50 | 32 |
| 22 | 147 | 226 | 220 | 192 | 91 | 74 | 62 | 84 | 102 | 91 | 126 | 47 | 25 |
| 23 | 165 | 276 | 354 | 212 | 108 | 96 | 81 | 92 | 144 | 121 | 147 | 84 | 29 |
| 24 | 147 | 359 | 430 | 329 | 126 | 80 | 63 | 86 | 118 | 100 | 128 | 44 | 26 |
| 25 | 137 | 157 | 166 | 168 | 83 | 64 | 58 | 84 | 102 | 90 | 127 | 38 | 25 |
| 26 | 135 | 227 | 243 | 183 | 81 | 63 | 59 | 81 | 126 | 92 | 129 | 44 | 30 |
| 27 | 124 | 111 | 146 | 147 | 82 | 62 | 57 | 73 | 106 | 88 | 126 | 43 | 24 |
| 28 | 123 | 142 | 141 | 152 | 77 | 56 | 57 | 81 | 102 | 89 | 126 | 41 | 26 |

FIG. 11, Cont'd

METHOD FOR DETECTING MALFUNCTIONING TURBO-DIESEL CYLINDERS

The invention relates to a diagnostic system and method for identifying malfunctioning cylinders in a turbo-diesel engine and the detection of cylinder misfiring. More in particular the invention relates to misfire detection in multi-cylinder turbocharged diesel engine-systems.

Cylinder malfunction in diesel engines is a known cause of reduced engine performance and further results in pollutant exhaust emissions. Cylinder malfunction is understood to include misfiring, incomplete or defective combustion, inoperative cylinders, or other cylinder related problems or disturbances having a permanent character, such as fuel injector defects. Cylinder misfiring in particular has been understood to be a mayor contributor to increased pollutant emissions in diesel engine systems, such as turbo-diesel engines, and is known to have a potentially damaging effect on emission control devices. The occurrence of incomplete combustion and misfiring are causes of cylinder malfunction. Throughout the specification, a 'firing operation' includes operation steps of an engine that results in either a fire or misfire condition. Causes of malfunction may originate from a compromised physical integrity of the cylinder head or cylinder block, and more commonly include damage to the injector element of the cylinder. Complex hydrocarbons, carbon monoxide and other products of incomplete combustion will then be excessively introduced into the exhaust gas. The presence of the latter products in the exhaust gas is often only detectable using specialized equipment. A malfunctioning cylinder may therefor go undetected for any extended period of time, thereby increasing the risk of further detriment of the physical integrity of such a cylinder. Further detriment of physical integrity of a cylinder is known to give rise to closely spaced intermittent misfiring, which is in particular known to cause excessive amounts of unburnt fuel to reach the engine emission control devices giving rise to local exothermic reactions. Exothermic reactions in the emission control devices can often have damaging or destructive results. Pollutant emissions from unburnt diesel fuel are further also known to be harmful to the environment and are health-detrimental. Such emissions may also include fuel additives and known carcinogenic compounds. Among the whole of incomplete combustion occurrences, misfiring is here understood as the substantially entirely incomplete combustion or the lack of combustion of injected fuel into a cylinder. It can be understood that some level of incomplete combustion is unavoidable in current internal combustion engines, even under normal operating conditions. Signs of unavoidable incomplete combustion and signs of a malfunctioning cylinder can be very similar in the early stage of the malfunction. Misfiring may more commonly occur when exhaust gas is recirculated to the inlet of an engine. Detection of misfiring may, in the latter situation, not be indicative of a malfunctioning cylinder. Unavoidable incomplete combustion therefore poses an obstacle for the accurate detection of any more serious form of incomplete combustion, namely that indicative of a malfunctioning cylinder. Many symptoms of a defective cylinder remain virtually undetectable to a vehicle driver until the engine performance is noticeably altered. Such a problem is therefor currently often detected only during routine workshop inspection. The detection of a malfunctioning cylinder during such an inspection can be untimely with regard to preventing the progression of damage.

Turbo-diesel engines are often equipped with a crankshaft position sensor. Turbo-diesel engines are also often already fitted with a pressure sensor in the exhaust e.g. in order to allow for controlled adjustment of a variable geometry turbine or VGT to steer pressure drop over the exhaust. WO2019088839: System and method for detecting malfunctioning turbo diesel cylinders describes a method wherein pressure values are sampled of a pressure sensor that measures a pressure value in an exhaust path of a cylinder, as a function of crankshaft angle position. For each cylinder fired in succession at least two sampling values are attributed for at least two successive crankshaft angle positions of a pressure pulse during a cylinder firing operation and a boundary is determined for a coordinate (PA, PB) formed by a tuple of sampling values. A misfire condition is diagnosed if the coordinate formed by said tuple of sampling values is outside the boundary. However, in the disclosed method, although satisfying diagnostics can be obtained for specific engine conditions, such as load and engine speed, it is difficult to have a diagnosing test that is robust for engine conditions varying over a wide range, in particular, ranging from a lowest engine speed (rlow) to a highest engine speed (rhigh).

Accordingly a need is felt to be able to identify and diagnose malfunctioning cylinders in a turbo-diesel engine using a method which eliminates unnecessary workshop inspections, is less-invasive than known methods for determining cylinder misfire and preferably uses already present standard pressure sensors in the exhaust so as to save on service costs. In particular the need is felt to diagnose malfunctioning cylinders in a turbo-diesel engine and to provide a method for using a pressure sensor associated with a variable geometry turbine. Further this includes the need for determining when a cylinder suffers from an elevated incidence of incomplete combustion and thus higher toxic emissions, even before misfiring would become otherwise workshop detectable.

Accordingly it is an object of the present invention to propose a method and system for comparing combustion behavior in order to identify malfunctioning cylinders, while on the road, through analyzing the combustion behavior thereof. In a more general sense it is thus an object of the invention to overcome or reduce at least one of the disadvantages of the prior art. Alternatively it is an object of the invention to at least provide a useful alternative.

To this end the invention provides for a method and a system as defined in one or more of the appended claims. According to the invention, a diagnostic method is provided for diagnosing a misfire condition of individual engine cylinders in a turbocharged diesel engine having at least a first and a second cylinder. The diagnostic method is characterized by defining a group of diagnosing functions (f1 ... fn), each having as inputs a selected number ($P_\alpha$, $P_\beta$) of subsequent sampling pressure values of a tuple P (p1 ... pm) and having an output diagnosing a misfire condition when the diagnosing function (f1 ... fn) is outside a threshold (t1 ... tn); determining an error function (e1 ... en), which is a function of measured false fails and false passes for said diagnosed misfire condition by said diagnosing function (f1 ... fn), in each of an engine speed region, ranging from a lowest engine speed (rlow) to a highest engine speed (rhigh), for selected engine speed range intervals (s1 ... sl), and selecting a diagnosing function fi from the group of diagnosing functions (f1 ... fn), wherein fi having an error function ei that is lowest over the entire speed range ([rlow-rhigh]). The number n of diagnosing functions (f1 ... fn) in the group of diagnosing functions can be more than 7.

By the disclosed method, a reliable diagnosing function test can be identified that is able to diagnose a misfire condition over a wide range of engine speed range intervals, e.g. from a range substantially below 1000 rpm to a range as high as 4000 rpm. In addition, the disclosed method provides for a diagnosing function diagnosing function formed by combining at least two basic functions from a set of basic functions (c1 ... cl) on selected number (Pα, Pβ) of sampling values of the tuple P for at least two successive crankshaft angle positions of a pressure pulse during a cylinder firing operation, said basic functions including at least two of

- a single sample characteristic (c1)
- a delta pressure characteristic (c2) between subsequent samples
- a mean pressure characteristic (c3) over subsequent samples
- a variance characteristic (c4) over subsequent samples
- a slope characteristic (c5) of a linear fit over subsequent samples
- an intercept characteristic (c6) of a linear fit over subsequent samples
- a delta characteristic (c7) between subsequent mean pressure values The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

FIG. 1 schematically shows a diagnostic system for identifying a malfunctioning engine cylinder in a turbo-diesel engine;

Figure 7:
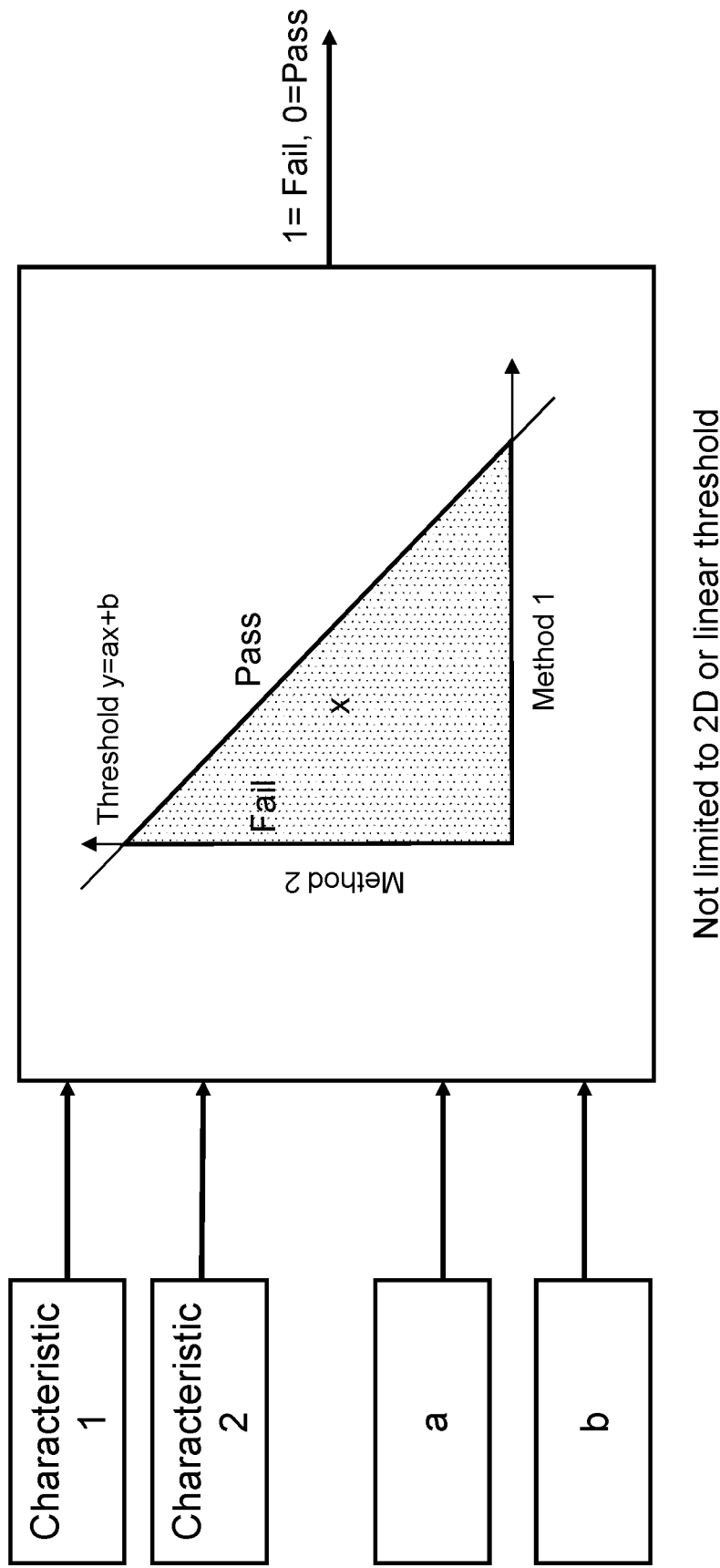

FIG. 7 gives an example for combining two characteristics

Figure 8:
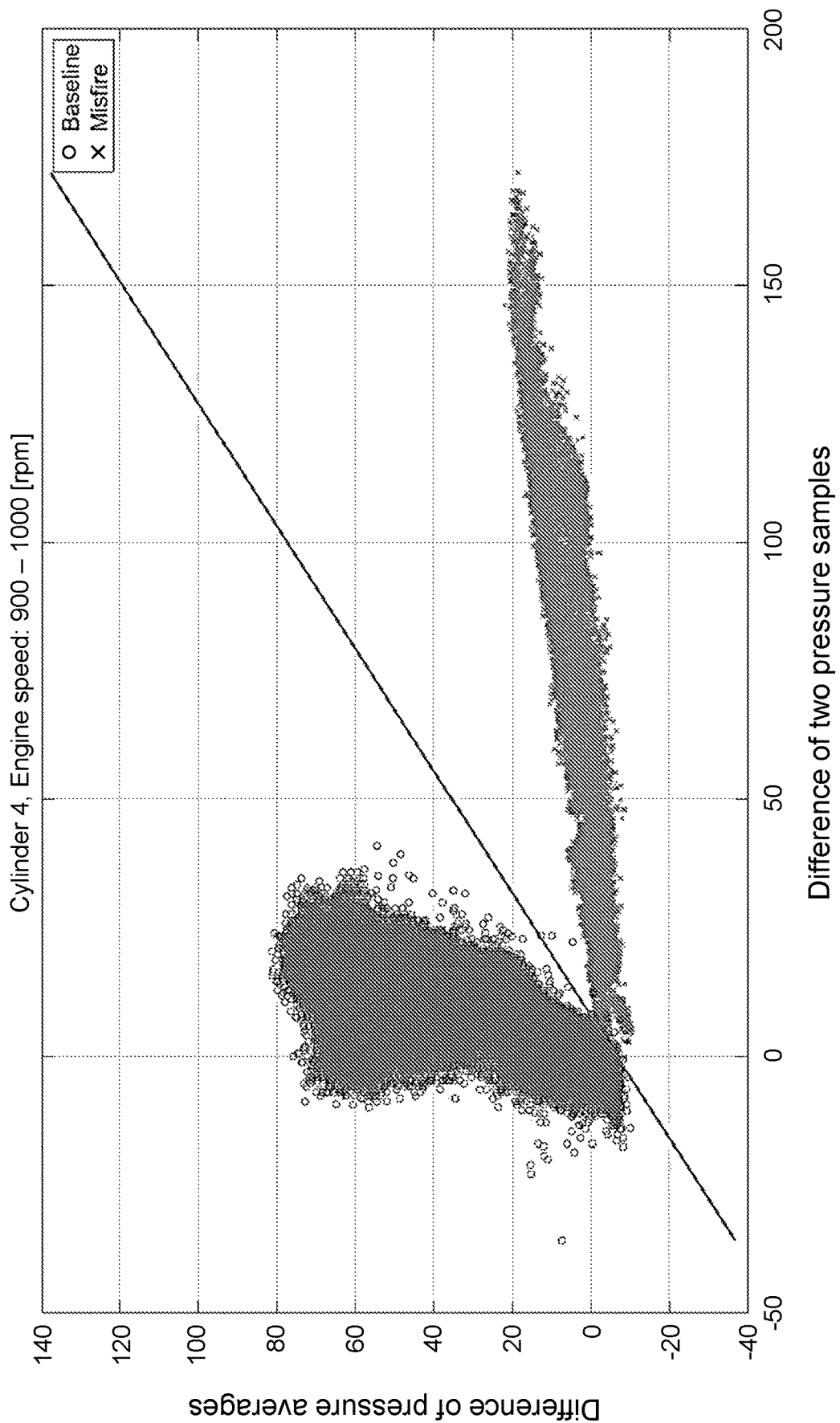
Figure 9:
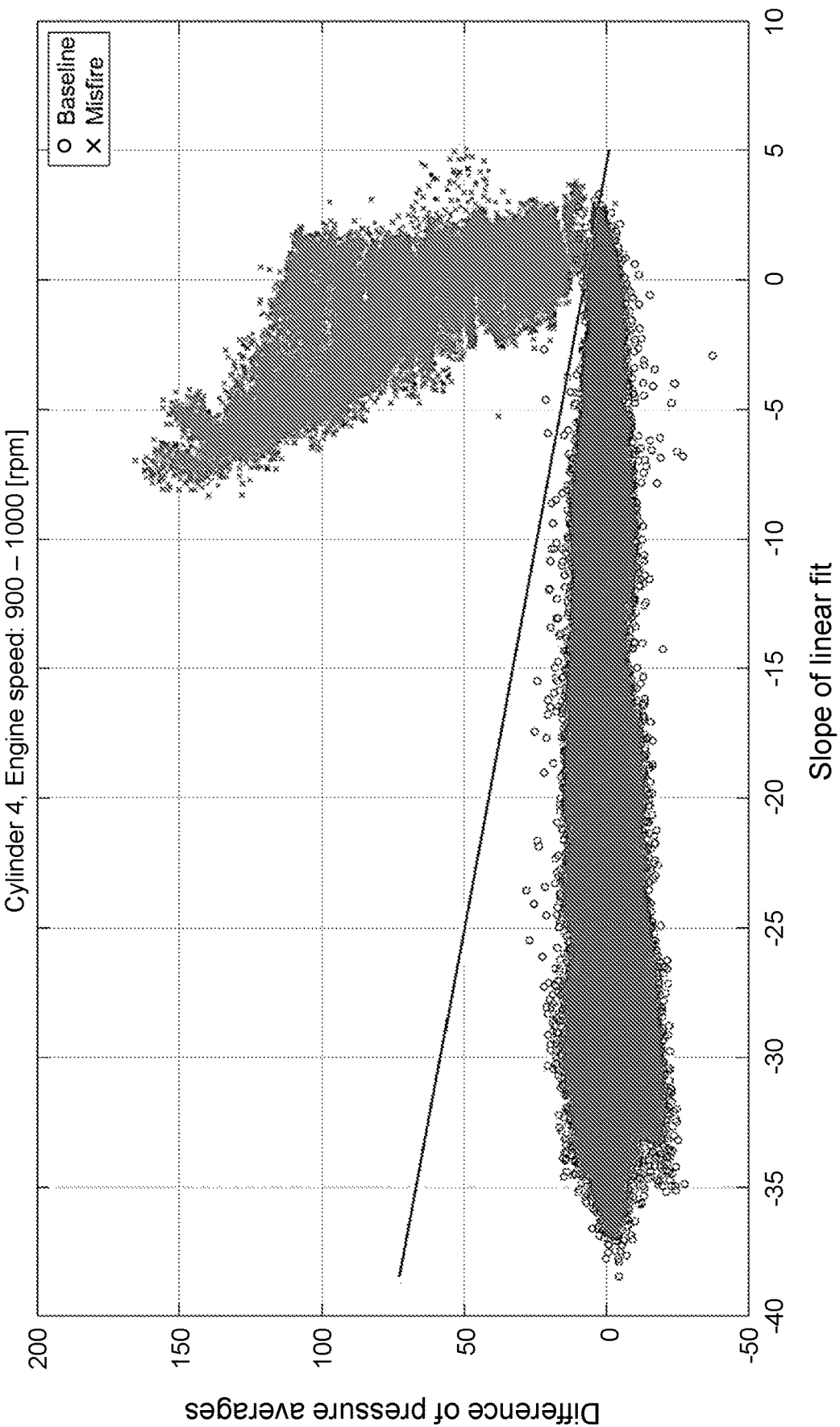
Figure 10:
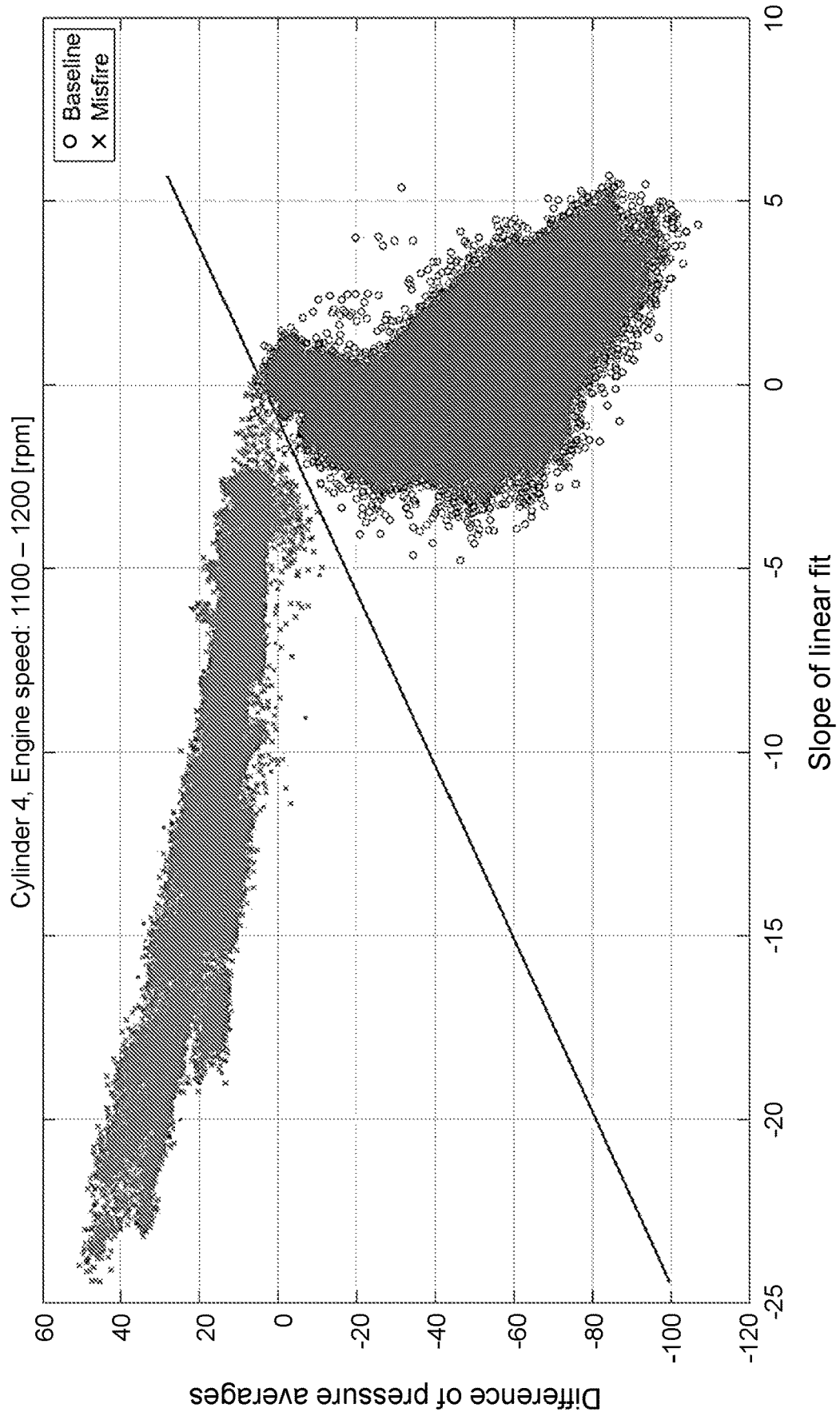
Figure 12:
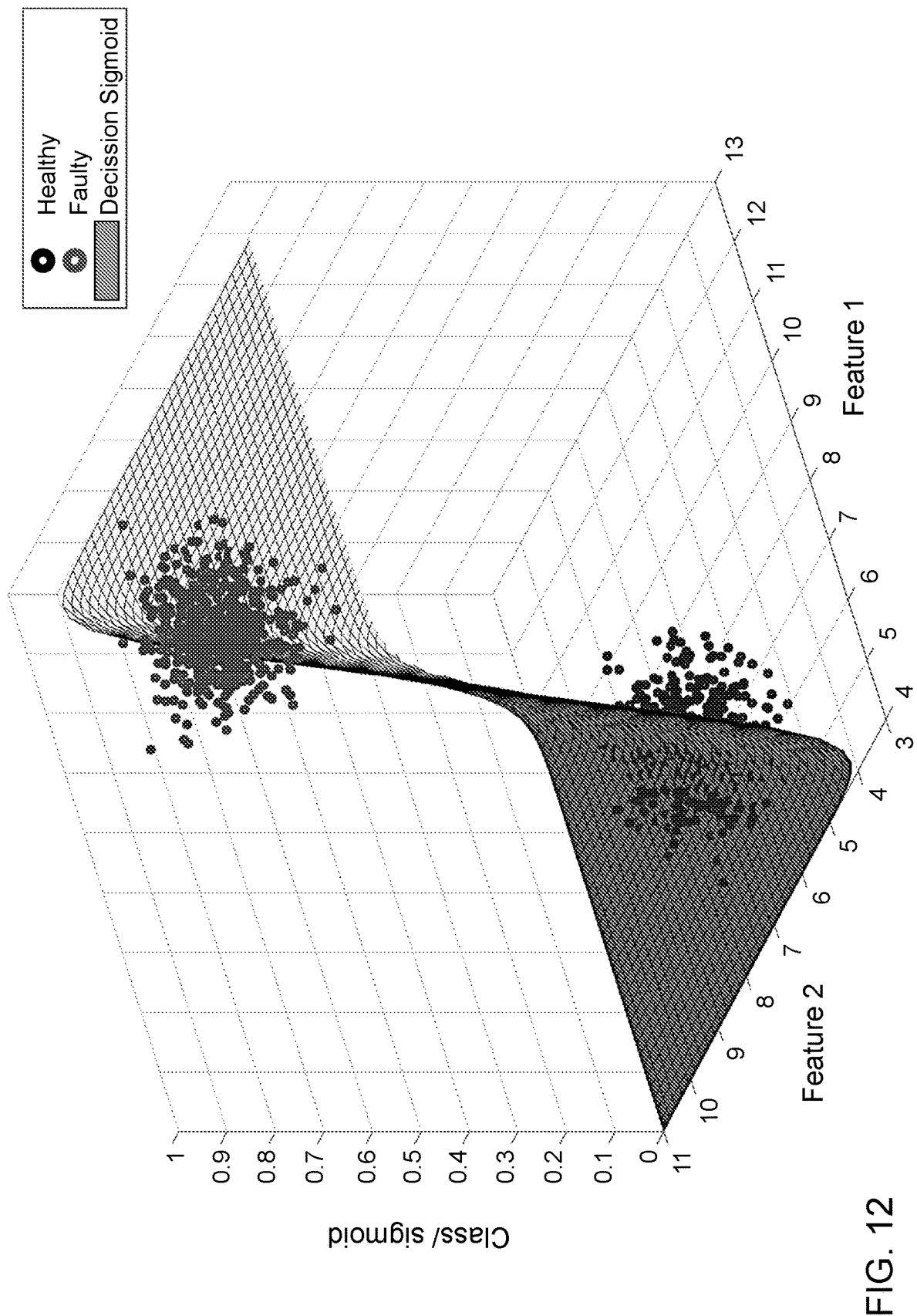

FIG. 8-10 shows various combinations of basic functions applied in the diagnosing function;

FIG. 11 shows a representative analysis of measured false fails and false passes;

FIG. 12 a binary classifier for a combination of two features.

Figure 1:
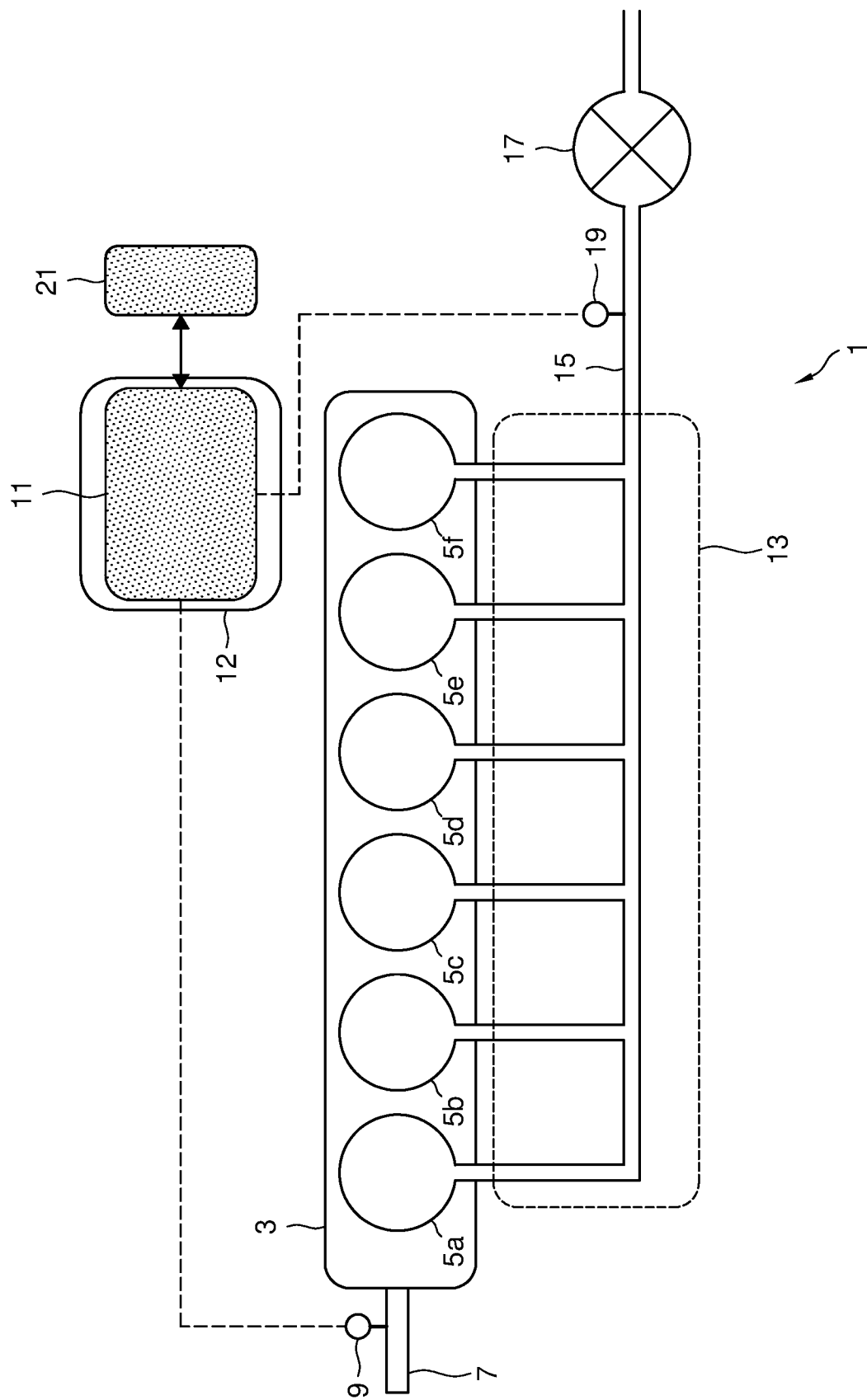
Figure 2A:
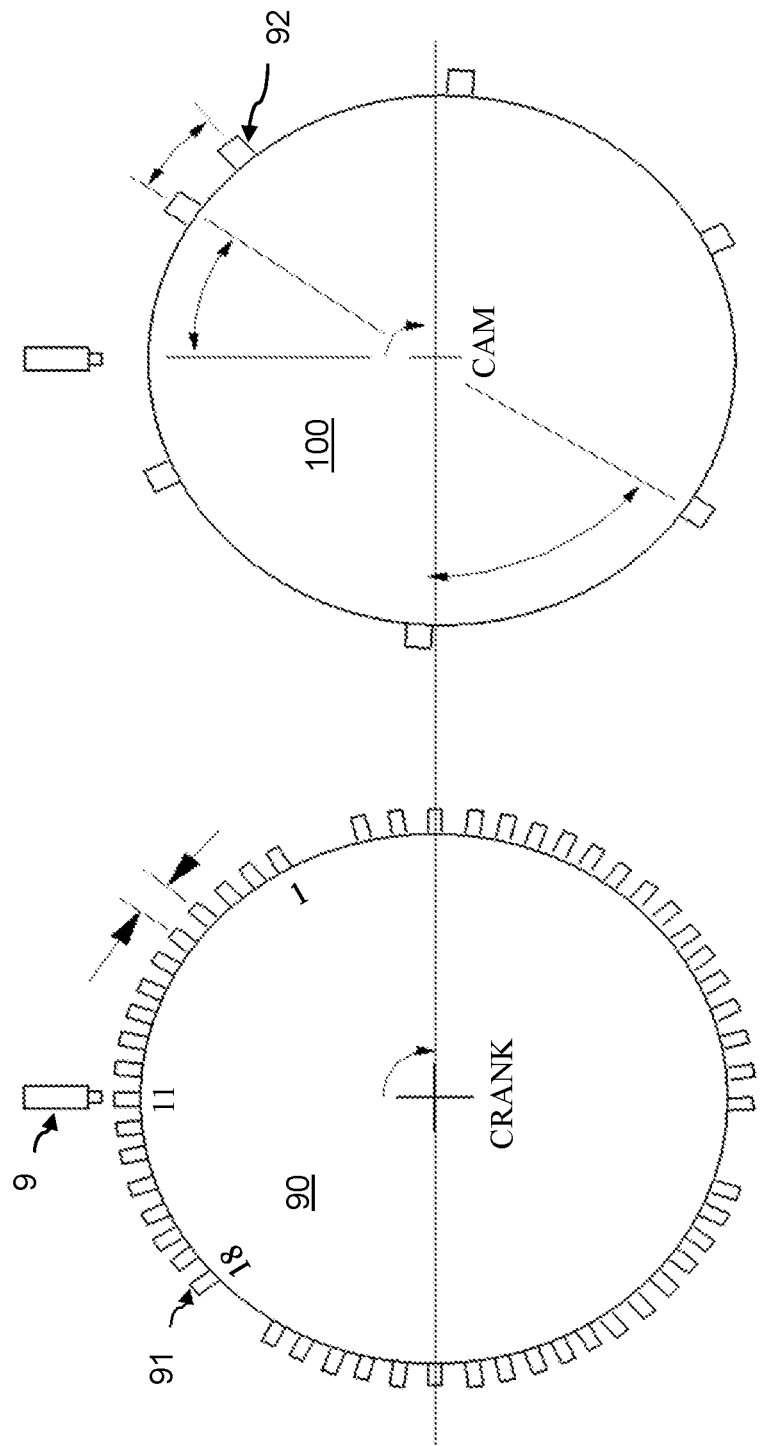
FIGS. 2A and 2B show an embodiment of a crankshaft sensor.

In FIG. 1 a diagnostic system 1 for diagnosing engine cylinders in a turbocharged diesel engine or turbo-diesel engine 3 is schematically illustrated. In the diagnostic system 1 of FIG. 1 the turbo-diesel engine 3 includes six cylinders 5a,5b,5c,5d,5e,5f, a crankshaft 7 and a crankshaft position sensor 9. The crankshaft position sensor 9 is arranged for measuring the rotational crankshaft position and is further associated with a processor unit 11. The processor unit 11 is arranged to determine the crank-angle of each of the cylinders 5a,5b,5c,5d,5e,5f from a rotational crankshaft position. The system further comprises a common exhaust gas manifold 13 connected to a shared exhaust conduit 15, together defining a shared exhaust path for the cylinders 5a,5b,5c,5d,5e,5f. In the example, exhaust conduit 15 is connected to a variable geometry turbine or VGT 17 and is further provided with an absolute pressure sensor 19 provided in the exhaust path 15, that connects to cylinders 5a-5f. Preferably the pressure is closest by the cylinder exhausts to optimize the pressure pulse sampling. In the example, the pressure sensor is closer to the last cylinder, but also configurations are feasible where the pressure sensor is provided at mid position or for each individual cylinder. Preferably, the sensor is away from further downstream elements such as a turbine or exhaust gas recirculation cooler and circuit. The sensor is robust and heat and pollutant proof, e.g. a ceramic capacitive sensor or any suitable type, such as a piezoelectric with a pressure signal represented as a voltage. Pressure sensor 19 is communicatively connected to processor unit 11. The pressure may be a gauge pressure, relative to atmospheric pressure, or a differential pressure, relative to e.g. pre-turbine and boost pressure, post turbine or the like. Using crank position information, the pressure signal in voltage is converted to digital signal using an analog to digital converter e.g. on a 30 degrees crank angle interval. In FIG. 2A it is shown that a crank shaft detector comprises a 'toothed' wheel, revolving with the crank shaft. The toothed wheel can in practice have other marks than teeth, such as slots etc. The teeth passing the crank speed sensor can be used as a trigger to execute the AD conversion, this can be specified e.g. per 30 degrees crank angle, which amounts to 5 tooth pulses. A sample position between teeth can be achieved with interpolation of the location between teeth.

Figure 2B:
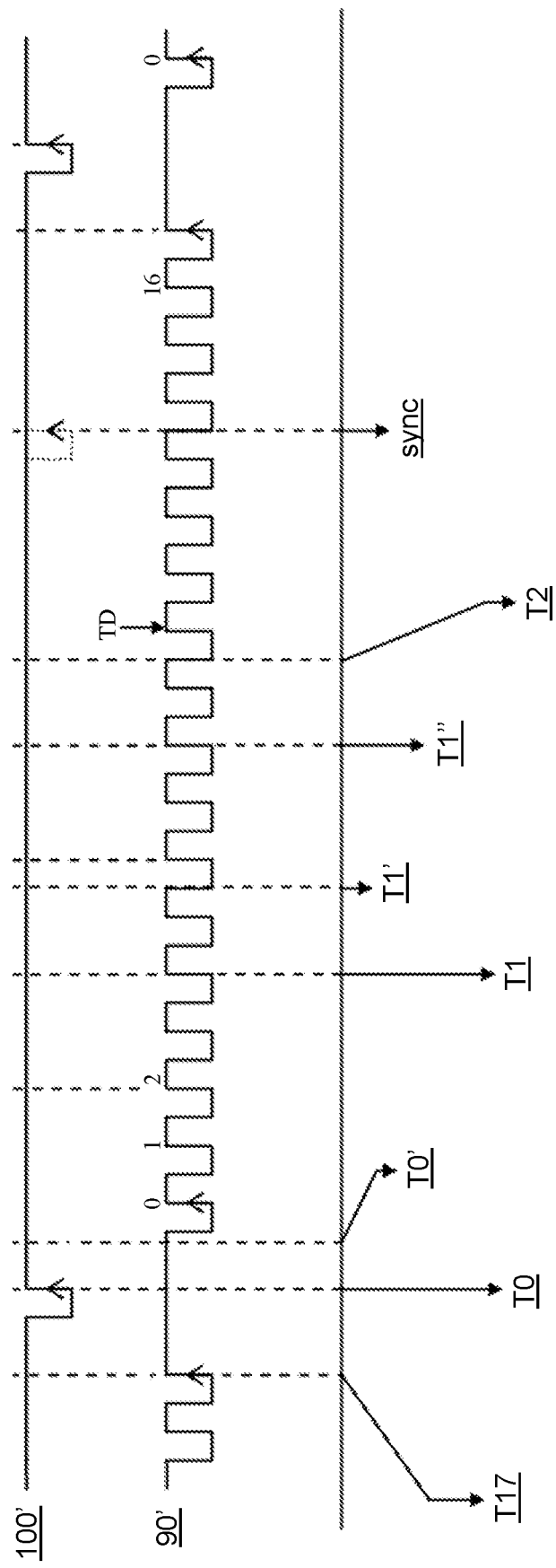

FIGS. 2A and 2B show a more detailed embodiment of a crankshaft sensor 9, that detects an angular position of the crankshaft, by a flywheel 90 having detector markings 91 spaced at regular angles, wherein the passing of a marking is associated with passing of a crankshaft angle. In more detail, an example of a crankshaft position sensor 9 is shown for a six cylinder configuration. The flywheel of the engine has slots machined at 6 degree intervals around its periphery. The teeth on the crankshaft wheel 90 may be sensed by a variable reluctance sensor 9 or any suitable alternative, (inductive, magnetic, optic, etc.) which is decoded by hardware to provide a pulse train where a rising edge may indicates the transition from metal to the air gap of the tooth/slot. The decoded signal provides coarse but accurate position information which is used for engine speed measurement and fuel pulse scheduling. Three pairs of "slots" are not machined, which is used to determine the position of the cylinder.

The cam shaft 100 has six equi-spaced teeth 91, associated with a specific cylinder of the engine. The teeth on the camshaft wheel may be sensed by an inductive or variable reluctance sensor 9 or any suitable alternative (magnetic, optic, etc.) which is decoded by hardware to provide a pulse train where a threshold, rising edge or zero crossing or other method may indicates the center of the tooth or slot. Alternatively, the flywheel is provided with holes that, when they pass the sensor, cause a change in voltage (spike). As shown in the figure, there are 18 tooth +2 missing tooth per cylinder at 6 degrees crank angle interval (center to center), which covers 120 degrees crank angle segment. With the missing tooth, the piston position is known, for example: 13 teeth after the missing teeth passed the sensor, 2 pistons will be in Top Dead Center (TDC) position. Then, the only missing information is which cylinder pair is at combustion TDC. For this, the cam shaft is also equipped with a 7th teeth (slot) and a inductance sensor. The cam shaft rotates with half the speed of the crank shaft. The passing of 6 of the teeth of the cam shaft coincide with passing of the missing teeth of crank shaft. With this, synchronization can be checked. The seventh teeth is positioned for example about 15 degrees before the cam shaft teeth of cylinder one. When this seventh tooth is passing the sensor (sync), the next cylinder ready to fire is cylinder 1. The start of a cycle is indicated by as T0, which can be derived from the cam shaft tooth signal 100' or as failsafe, the start T0 of the 17 pulse train. The crankshaft position is used to determine the injection trigger signals: T1, T1' (logical start) T"1 and end T2 (finish), scheduled around the cylinders Top Dead center.

Information from the sensor position can be converted to engine speed for example by measuring the Time T17 for 17 pulse events. Base principle:

$$\text{engine speed} = \frac{6/360}{\text{time between two succeeding teeth}} [\text{min}^{-1}]$$

In the engine control unit 11, the pressure voltage signal may be filtered using an analog resistance capacitor filter e.g. with a cut off frequency of 400 Hz. This is to remove high frequency noise from the signal. To see this in perspective, the combustion pulses occur three times per revolution and the maximum engine speed is 2200 rpm. To get frequency information of the combustion pulses, the cut off frequency is preferably above 2200/60×3=110 [Hz]. Note that there are three combustions per revolution in a six cylinder four-stroke engine.

The processor unit 11 may be part of an electronic control unit or engine control unit or ECU 12 which is arranged for on-board diagnostics. The processor unit 11 is arranged for receiving and storing pressure data from the pressure sensor 19 and crank-angle data from the crankshaft position sensor 9. As is common in four-stroke engines, two crankshaft revolutions are necessary for each cylinder to perform a full four-stroke cycle. A four stroke engine has the following four strokes:

Intake: Piston moves down and inlet valve is opened to let the compressed air in the cylinder Compression stroke: Inlet valve is closed and piston moves up to compress the charged air even further. This compression also increases temperature of the air.

Combustion stroke: Around Top Dead Center, fuel is injected, which start to auto-ignite due to the temperature. This increases the pressure even more. The fuel injection continues while the piston moves down.

Exhaust stroke: the exhaust valve open and the piston moves up, releasing the air into the exhaust.

The opening of the valves starts before Bottom Dead Center, while in the combustion stroke, and remains open until just before Top dead Center, while in the exhaust stroke.

After a successful combustion, the pressure in the combustion chamber is high relative to the exhaust pressure. The combusted gasses will flow through the exhaust port when the exhaust valve is opened. This will cause an initial pressure pulse traveling through the exhaust manifold. A second pressure pulse may occur when the piston moves up.

A crank-angle of each individual cylinder 5a,5b,5c,5d,5e, 5f can be predetermined by the engine construction. The processor unit 11 is arranged to determine a momentary pressure signal for each of the cylinder 5a,5b,5c,5d,5e,5f at their respective moment of arriving at a combustion-related-crank-angle within a single four-stroke cycle of all cylinders. In the embodiment, the processor unit is arranged for performing acts of:

sampling pressure values of the pressure sensor in the common exhaust path as a function of crankshaft angle position; and attributing for each cylinder fired in succession at least two sampling values ($P_\alpha$, $P_\beta$) of a tuple of sampling values P for at least two successive crankshaft angle positions of a pressure pulse during a cylinder firing operation determining a threshold from a calibration set, e.g. a set identifying verified fire events or misfire events for selected sampling values, for a diagnosing function (ci, cj) formed by a tuple of basic function values (c1, ... cl) on the tuple of sampling values P; and diagnosing a misfire condition if said diagnosing function is outside the threshold. The basic functions may act on different selections of pressure samples of the tuple P of sampling values. Some basic functions may act on a single sampling value. The pressure values may be sampled by a sampling rate e.g. dependent on crankshaft. The number of samples can be increased by including samples outside the angle interval between crank opening of two succeeding firing cylinders. E.g. samples may be chosen such that the pressure samples of the previous cylinder are available to be used as a reference. The diagnosing function is formed from a set of basic functions (c1, ... , cl) on a succession of at least two sampling values ($P_\alpha$, $P_\beta$) for at least two successive crankshaft angle positions of a pressure pulse during a cylinder firing operation, said basic functions including at least two of a single sample characteristic (c1)

a delta pressure characteristic (c2) between subsequent samples a mean pressure characteristic (c3) over subsequent samples a variance characteristic (c4) over subsequent samples a slope characteristic (c5) of a linear fit over subsequent samples an intercept characteristic (c6) of a linear fit over subsequent samples a delta characteristic (c7) between subsequent mean pressure values.

For every misfire evaluation, up to 9 pressure samples may be available.

In more detail, the basic functions may be determined as follows:

1 Single Sample Characteristic (c1)

Single pressure sample=$p_i$ with $i=1, \ldots 9$

Hence, $c1(Pi)=Pi$

2 Delta Pressure Characteristic (c2)

Delta pressure=$p_i - p_j$ with $i=1, \ldots, 8, j=2, \ldots, 9$ and $j>i$

Hence $c2(Pi,Pj)=Pi-Pj$

3 Mean Pressure Characteristic (c3)

$$\text{mean pressure} = \frac{1}{n}\sum_{i=k}^{m} p_i,$$

with $k = 1, \ldots, 9, m = 1, \ldots, 9$ and $n = m - k + 1$

Note: It is possible to "calculate" the mean over 1 sample.

Hence $c3(Pi \ldots Pj)=\text{mean}(Pi \ldots Pj)$

4 Variance Characteristic (c4)

$$\text{Pressure variance} = \frac{1}{n-1}\sum_{i=k}^{m}(p_i-\mu)^2,$$

where $\mu$ is the mean pressure $= \frac{1}{n}\sum_{i=k}^{m}p_i$, and $n = m - k + 1$ Hence $c4(Pi,Pj)$=variance$(Pi,Pj)$ 5 Slope Characteristic (c5) and 6 Intercept Characteristic c6)

Figure 3:
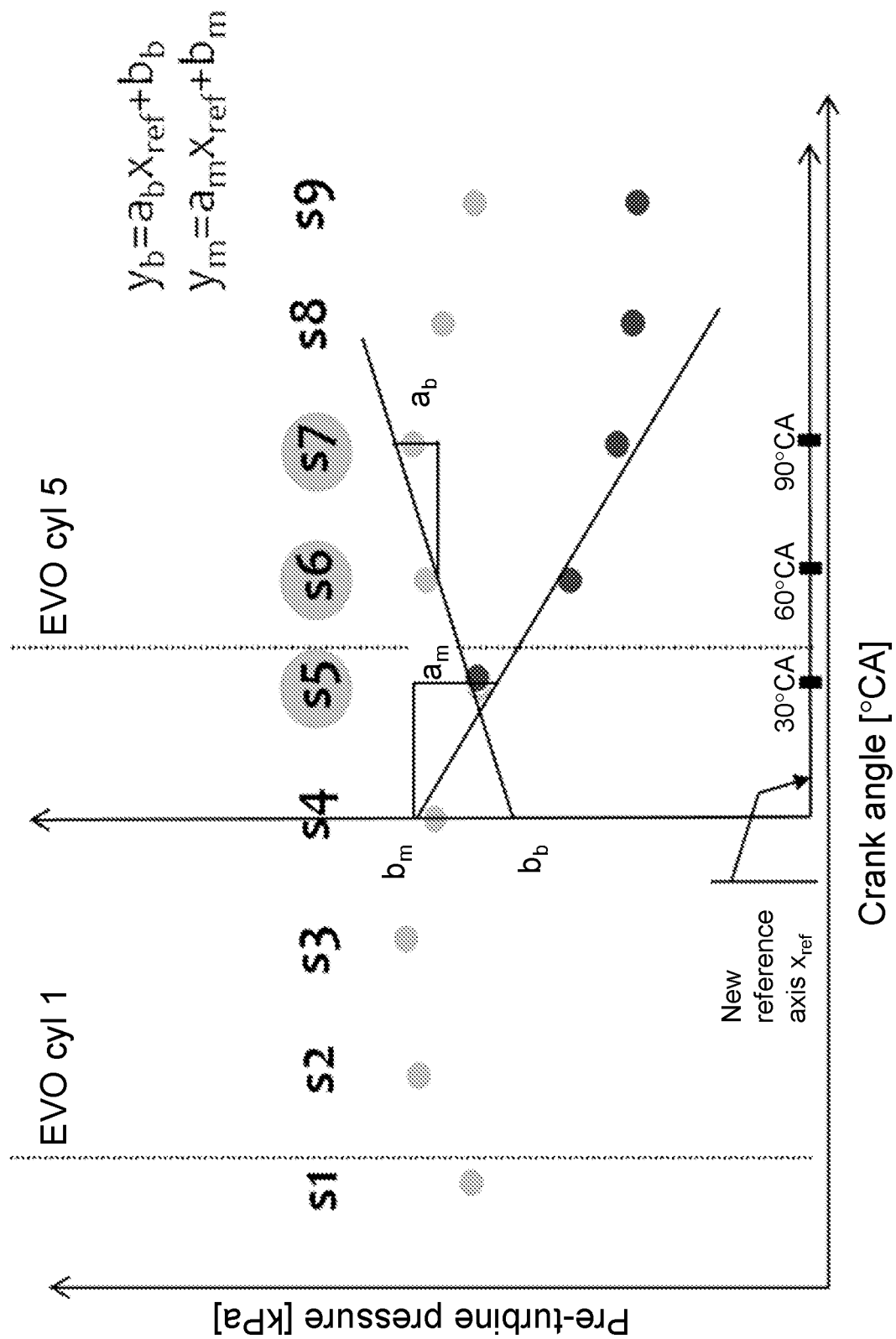
FIG. 3 shows a procedure for defining the slope and intercept characteristic.

The slope (a) and intercept (b) result from a linear fit (y=ax+b) on the pressure $p_k$ through $p_m$. The linear fit is such that it minimizes the squared error, a.k.a. Least Squares. There are various ways to determine the fit:
Iterative optimization, e.g. steepest decent
Closed form/analytical solution With regard to FIG. 3 a procedure is described for defining the slope and intercept characteristic on a number of successive sampling values. As can be seen for subsequent sampling pressure values s5, s6 and s7 a linear relation yb (a, b), ym (a,b) is established between crank angle and pressure values. In above equation b is the intercept and a is the slope. Next, the following equation is solved:

$$\begin{bmatrix}b\\a\end{bmatrix} = (X^TX)^{-1}X^Ty \text{ with Design matrix } X = \begin{bmatrix}1 & x_{ref,k}\\ \vdots & \vdots \\ 1 & x_{ref,m}\end{bmatrix}; \text{ and}$$

$$\text{Pressure values } y = \begin{bmatrix}p_k\\ \vdots \\ p_m\end{bmatrix}$$

The part $(X^TX)^{-1}X^T$ of the above equation is a function of the number of pressure samples and can be solved offline.

Hence $c5(Pi,Pj)$=slope$(Pi,Pj)$;

$c6(Pi,Pj)$=intercept$(Pi,Pj)$

7 Delta Characteristic (c7) of Pressure Averages $$\text{Delta pressure averages} = \frac{1}{n_1}\sum_{i=k}^{m}p_i - \frac{1}{n_2}\sum_{i=o}^{p}p_i, \text{ with}$$

$k = 1, \ldots, 6, m = 2, \ldots, 7, o = 3, \ldots, 8, p = 4, \ldots, 9$ and $n_1 = m - k + 1$ and $n_2 = p - o + 1$ Hence $c7(Pi,Pj)$=Delta pressure averages$(Pi,Pj)$ As will be explained further below it is then determined whether a misfire condition exists by combining basic functions c1(Pi,Pj), . . . , c7(Pi,Pj).

Figure 4:
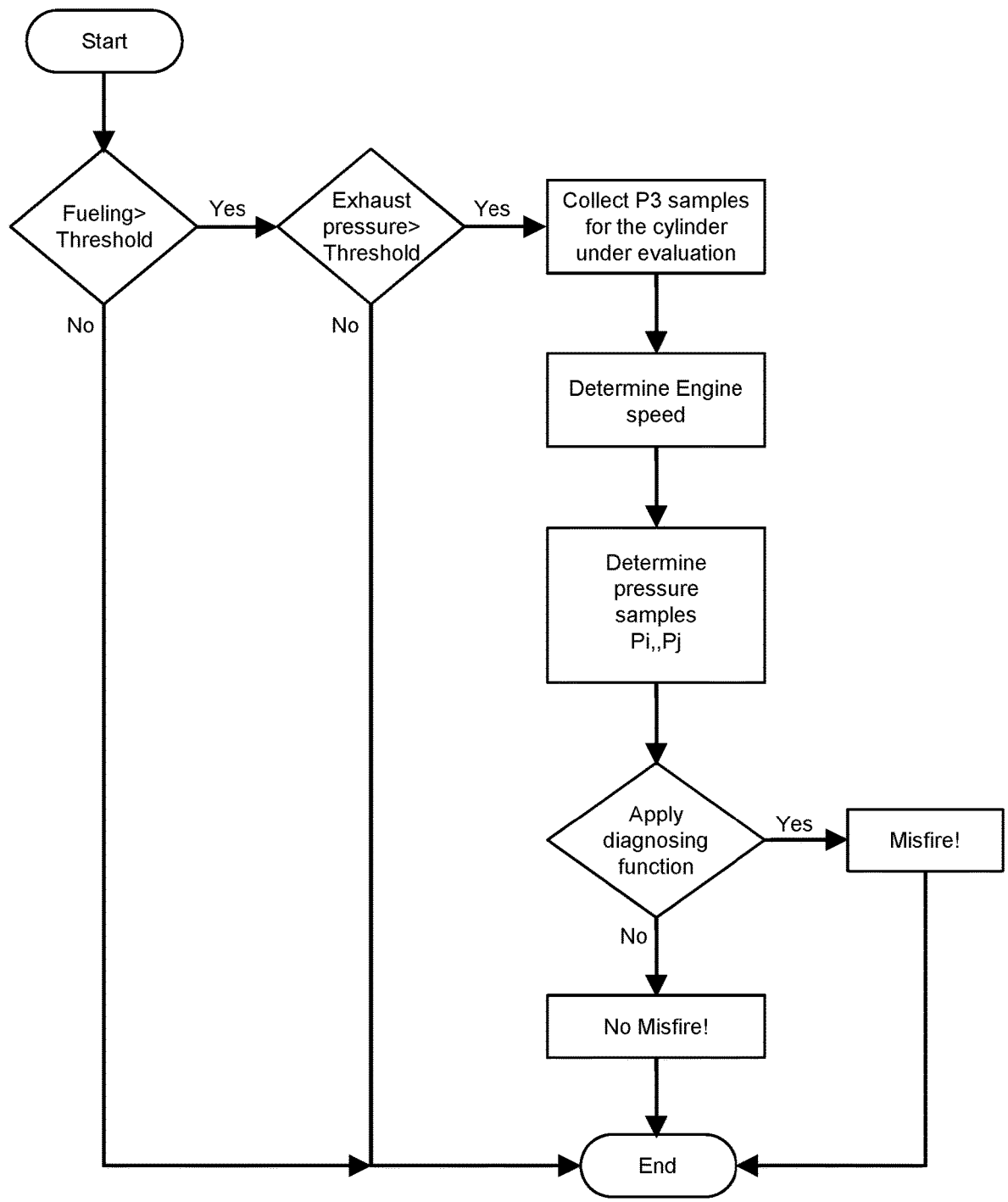
FIG. 4 shows a schematic diagnostic method.

FIG. 4 shows a schematic diagnostic method wherein an engine control unit is programmed, as follows. For example in a first step it is detected whether a fuel quantity that is provided to a cylinder is above a threshold.

Thus, misfire detection can be made dependent on a load condition. In a further step, it is determined what exhaust pressure is, and the diagnosis is continued when exhaust pressure is above threshold. Next, the engine speed is determined, in order to determine a threshold in this engine speed range for the specific cylinder under evaluation. Thus, the threshold t is determined in dependence of engine speed, for a number (e.g. smaller than 100) of engine speed intervals. Also, it is determined which pressure samples in this engine speed range for the specific cylinder are used for the basic functions (e.g. which 2 out of 9 samples), that is, the selected number of subsequent sampling pressure values are selected in dependence of cylinder position and engine speed. Next, misfire is diagnosed by evaluating the sample pressures according to a threshold by a diagnosing function as specified herewith. The diagnosing function may be the same for the entire engine speed range; but with different inputs and thresholds, leading to efficient and fast logic able to process the huge amount of test data. Also in the calibration, various strategies can be applied in combination.

Figure 5:
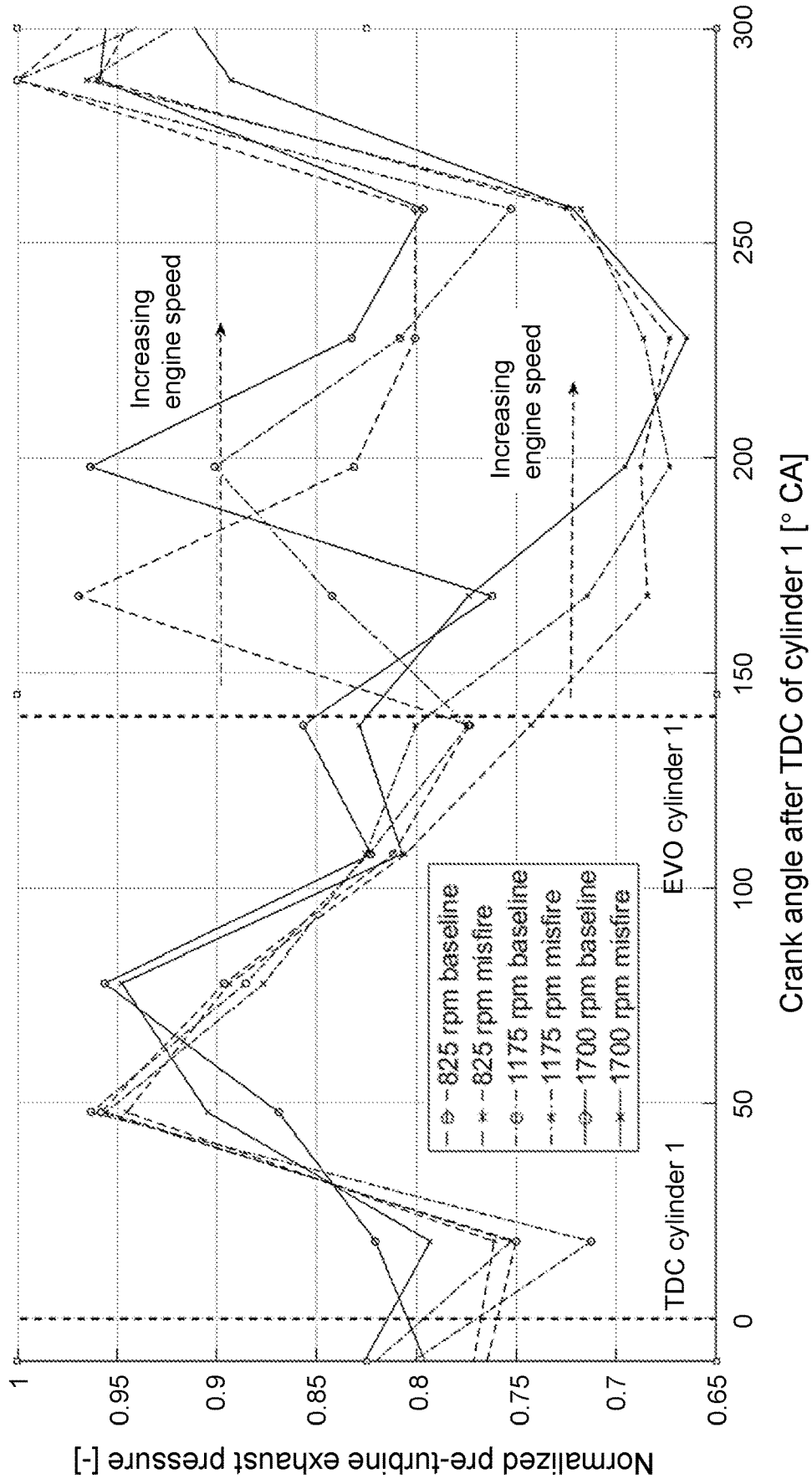
FIG. 5 shows engine speed dependency of the crank angle based sampling of the exhaust pressure.

FIG. 5 shows in more detail normalized exhaust pressure pulses at 50% load and for different engine speeds, both for normal combustion (baseline) and misfire on cylinder 1 of the combustion engine. With a crank angle based pre-turbine exhaust pressure sampling, pressure samples are taken at fixed crank positions. The exhaust pulse from the combustion or the missing pressure pulse from a misfire is expected after exhaust valve opening of the cylinder under evaluation. The information of the combustion or misfire is present for only a short sampling interval: after opening of the exhaust valve until the exhaust pressure pulse of the next firing cylinder arrives at the pressure sensor.

It can be seen that with increasing engine speed the missing pressure pulse occurs at a later pressure sample. With a crank angle based pre-turbine exhaust pressure sampling, the sampling frequency naturally increases at increasing engine speed. The time for the exhaust pressure pulse to reach the sensor is not depending on engine speed. Due to the increased sampling frequency, the combustion pulse can be seen at pressure samples taken at a later crank angle. An engine speed dependent calibration of the features and boundary function further enhances robust diagnosing. This engine speed dependency may be taken into account in the choice of the pressure sample that are used in the basic functions and also the threshold calibration.

Figure 6:
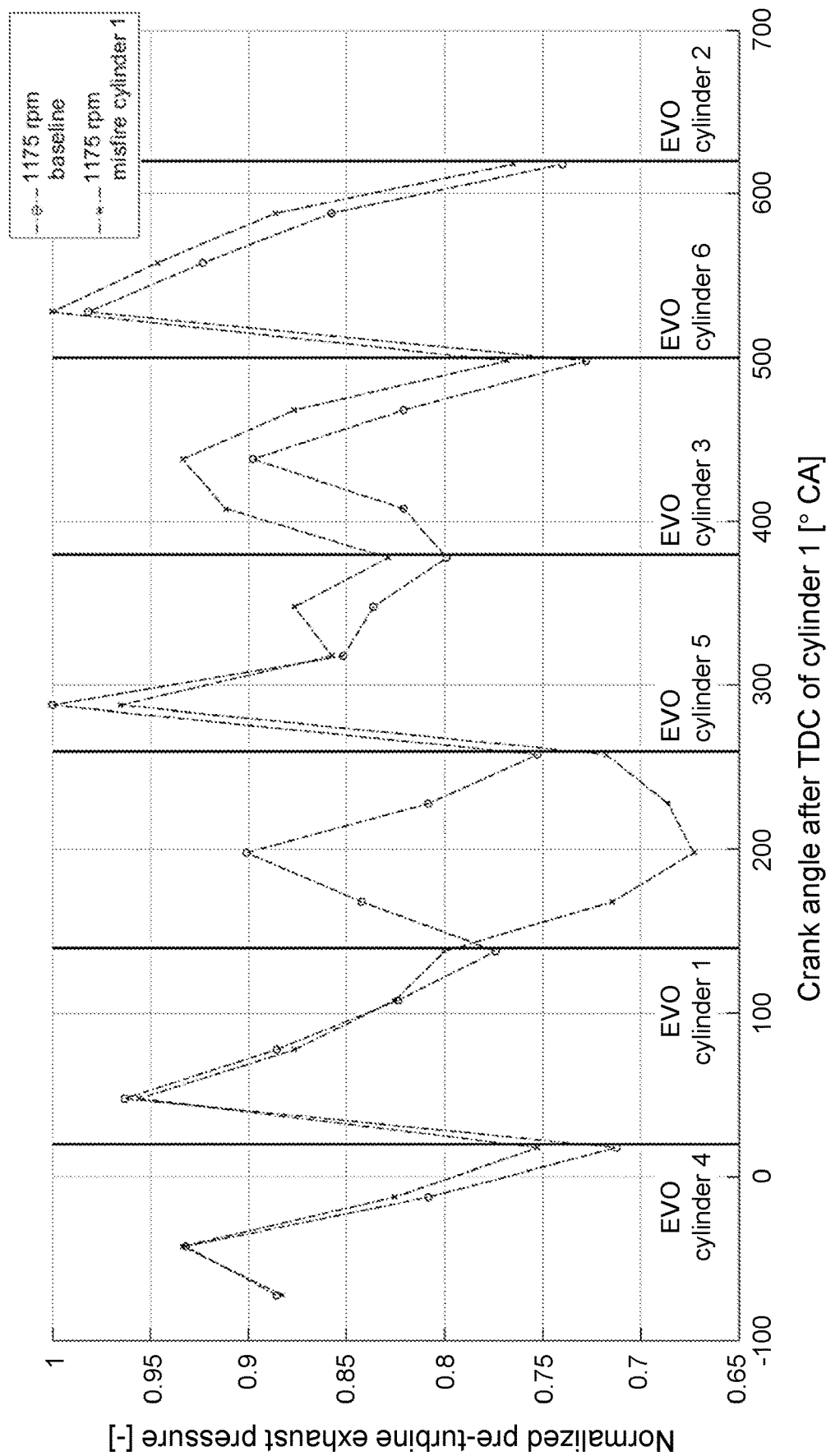
FIG. 6 shows the cylinder dependency of the crank angle based sampling of the exhaust pressure.

In addition to the above illustrated engine speed dependency for the pressure samples; an additional dependency may be formed by cylinder position as illustrated in FIG. 6. Cylinder position dependency is driven by the travel distance of the exhaust pressure pulse that may vary from cylinder to cylinder. In the Figure an example of the cylinder dependent exhaust pressure is shown on a six-cylinder in-line turbodiesel engine. The pre-turbine exhaust pressure sensor was located opposite to the exhaust port of cylinder 5. The distance from cylinder 4,5 and 6 to the sensors is short compared to the distance from cylinder 1,2 and 3. Due to the shorter distance, the peaks of the pressure pulses from cylinder 4,5 and 6 occur closer to the exhaust valve opening (EVO) then the peaks from the cylinders 1, 2 and 3. It can also be seen that each cylinder has a distinct waveform. Besides the distance, also the exhaust manifold geometry and other connecting volumes, e.g. exhaust gas recirculation, play a role in the pressure waveform at the sensor. For before mentioned reasons, cylinder dependent calibration of the pressure samples of the basic functions and boundary further enhances robust diagnosing.

FIG. 7 gives a further example how two of these characteristics can be combined, where not the characteristic, but the combination of the two provides a threshold, i.e. a threshold of fails and passes that may be formed by a threshold definition that divides regions in the coordinate space formed by tuples of said characteristics.

Realistic examples are provided in FIGS. 8-10 that show various combinations of basic functions applied in the diagnosing function, for diagnosing a misfire, in an engine speed region. In FIG. 8, the engine speed region concerns 900-1000 rpm, which is critical because of the low engine pressures in that region. Thresholds may be defined by a calibration set for engine speed regions of e.g. 100-300 rpm, wherein a threshold is determined between verified misfire events or 'fire' events. FIG. 9 shows another set of combination in the same engine speed region; FIG. 10 shows the same set as in FIG. 8 for another engine speed region, notably the region of 1100-1200 rpm.

As can be noted, while each set of combination is capable of identifying a diagnosing function that separates a misfire from a non-misfire tuple, a single diagnosing function, formed by a consistent combination of basic functions, ranging from a lowest engine speed (rlow) to a highest engine speed (rhigh), for selected engine speed range intervals (s1 . . . sl) is a challenge to find.

FIG. 11 exemplifies the method of selecting a diagnosing test that is able to minimize an error function of false diagnoses. The method includes defining a group of diagnosing functions (f1 . . . fn), each having as inputs a number of subsequent sampling pressure values (p1 . . . pm) and having an output diagnosing a misfire condition when the diagnosing function (f1 . . . fn) is outside the threshold (t1 . . . tn);

As examples of diagnosing functions a combination is tested of basic functions.

| Basic function | Name |
| --- | --- |
| 0 | No feature |
| 1 | Single Pressure Samples |
| 2 | Delta Pressure Samples |
| 3 | Average Pressure |
| 4 | Variance |
| 5 | Slope |
| 6 | Intercept |
| 7 | Delta Moving Average |

These functions are similar or identical to the characteristics (c1 . . . c7) exemplified earlier above.

Next, these functions are combined in 28 diagnosing functions, combining one or more features of these basic function class as follows:

| Diagnosing function as a combination nr | Basic function 1 | Basic function 2 |
| --- | --- | --- |
| 1 | 0 | 1 |
| 2 | 0 | 2 |
| 3 | 0 | 3 |
| 4 | 0 | 4 |
| 5 | 0 | 5 |
| 6 | 0 | 6 |
| 7 | 0 | 7 |
| 8 | 1 | 2 |
| 9 | 1 | 3 |
| 10 | 1 | 4 |
| 11 | 1 | 5 |
| 12 | 1 | 6 |
| 13 | 1 | 7 |
| 14 | 2 | 3 |
| 15 | 2 | 4 |
| 16 | 2 | 5 |
| 17 | 2 | 6 |
| 18 | 2 | 7 |
| 19 | 3 | 4 |
| 20 | 3 | 5 |
| 21 | 3 | 6 |
| 22 | 3 | 7 |
| 23 | 4 | 5 |
| 24 | 4 | 6 |
| 25 | 4 | 7 |
| 26 | 5 | 6 |
| 27 | 5 | 7 |
| 28 | 6 | 7 |

A representative analysis of measured false fails and false passes is shown in FIG. 11 for said diagnosed misfire condition for each cylinder by said diagnosing function (f1 . . . f28), in each of an engine speed region, ranging from a lowest engine speed (rlow) to a highest engine speed (rhigh), for selected engine speed range intervals (s1 . . . sl). From this analysis a diagnosing function fi is selected from the group of diagnosing functions (f1 . . . f28), wherein fi having an error function ei that is lowest over the entire speed range ([rlow-rhigh]).

In the found analysis, it can be seen that the better diagnosing functions are the ones with numbers 25, 26, 27 and 28, where a specific single diagnosing function can be chosen by minimizing the error function over the entire speed range. From this analysis multiple strategies can be proposed, such as obtaining a single diagnosing function over the whole engine speed range, or plural diagnosing functions, in dependence of a split point, e.g. a split at lower engine speeds, although such a split is not desirable due to complexity of the implementation. By a diagnosing function operating over the whole engine speed range, this problem can be solved.

FIG. 12 illustrates for a combination of two features feature 1 and feature 2, how a binary classifier such as a sigmoid function can be applied to identify a decision boundary. For constant sigmoid levels (decision boundaries) ranging from 0.1 to 0.9, setting the threshold at 0.1 will result in a good detection of a faulty situation, but it will not be very robust in healthy situations. Setting the threshold at 0.9 will result in a good detection of a healthy situation, but it will not be very robust in faulty situations. In practical examples a misfire is classify as faulty if the sigmoid $h_\theta(x) \geq 0.5$ The sigmoid can be interpreted as a cumulative probability function. At $h_\theta(x)=0.5$ [-], there is a 50% chance that the feature pair is either from healthy or faulty data. Once the fitted θ's have been obtained, the sigmoid value can be calculated for every new feature tuple. By setting a boundary on the sigmoid, the class can be predicted. The typical boundary value to use is 0.5[-] At this threshold the number of misclassifications can be determined.

To determine a threshold from a calibration set of verified positive or negative fire events, calibration data may be logged as follows:

Calibration data is processed by
  Transforming time based to crank angle based
  Calculate features of all classes, e.g. delta pressure, and all possible pressure samples, selected in dependence of cylinder position and engine speed;
  Determine response (0=baseline, 1=misfire)
  Split data on
    Cylinder; and
    Engine speed interval (currently 100 rpm interval); and train (70%) and validation set (30%)

Next, classification is applied on each feature pair, e.g. by fitting a sigmoid function For each pair the false classification counts are stored A choice can be made on the combination of feature classes and if beneficial to switch to another feature class on a different engine speed segment to determine which combination of feature classes to be used Once the choice is made for the feature class combination, the false classification counts can again be used to find the optimal combinations of pressure samples Then for every cylinder and engine speed interval, rerun the classification again for these optimal feature combinations and pressure samples Determine coefficients of the linear fit (e.g. with sigmoid=0.5)

To increase robustness for healthy data fine tuning threshold on newer data may be applied.

The threshold t may be determined in dependence of engine speed.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described while some of the embodiments described feature a four stroke, six cylinder configuration, the invention may be especially applied in other arrangements including 3, 4, 5 or any other numbers of cylinders. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extend that structure, material, or acts are considered to be essential they are inexpressively indicated as such. Additions, deletions, and modifications within the purview of the skilled person may generally be made without departing from the scope of the invention, as determined by the claims.

The invention claimed is:

1. A diagnostic method for diagnosing a misfire condition of individual engine cylinders in a turbocharged diesel engine having at least a first and a second cylinder, further comprising:

one or more pressure sensors for measuring a pressure value in an exhaust path of the at least first and second cylinder;

a crankshaft position sensor, for detecting a rotational crankshaft position; and a processor unit for reading the pressure sensor and the crankshaft position sensor;

wherein the processor unit is arranged for performing acts of:

obtaining a number of subsequent sampling pressure values (p1 . . . pm) of the pressure sensor as a function of crankshaft angle position;

selecting a diagnosing test for diagnosing a misfire condition based on the obtained sampling pressure values;

wherein selecting the diagnosing test is characterized by defining a group of diagnosing functions (f1 . . . fn), each having as inputs a selected number (Pα, Pβ) of subsequent sampling pressure values of a tuple P (p1 . . . pm) and having an output diagnosing a misfire condition when the diagnosing function (f1 . . . fn) is outside a threshold (t1 . . . tn);

determining an error function (e1 . . . en), which is a function of measured false fails and false passes for said diagnosed misfire condition by said diagnosing function (f1 . . . fn), in each of an engine speed region, ranging from a lowest engine speed (rlow) to a highest engine speed (rhigh), for selected engine speed range intervals (s1 . . . sl), and selecting a diagnosing function fi from the group of diagnosing functions (f1 . . . fn), wherein fi having an error function ei that is lowest over the entire speed range ([rlow-rhigh]).

2. The diagnostic method according to claim 1, wherein the number n of diagnosing functions (f1 . . . fn) in the group of diagnosing functions is more than 7.

3. The diagnostic method according to claim 1, wherein the number m of subsequent sampling pressure values (p1 . . . pm) of the tuple P is less than 12.

4. The diagnostic method according to claim 1, wherein the group of diagnosing functions (f1 . . . fn) are formed by combining at least two basic functions from a set of basic functions (c1 . . . cl) on a selected number (Pα, Pβ) of sampling values of the tuple P of sampling values, the basic functions including at least one of a single sample characteristic (c1)

a delta pressure characteristic (c2) between subsequent samples a mean pressure characteristic (c3) over subsequent samples a variance characteristic (c4) over subsequent samples a slope characteristic (c5) of a linear fit over subsequent samples an intercept characteristic (c6) of a linear fit over subsequent samples a delta characteristic (c7) between subsequent mean pressure values.

5. The diagnostic method according to claim 4, further comprising determining a threshold t from a calibration set, for said diagnosing function (ci, cj) formed by a tuple C of basic function values (c1, . . . , cl) on the tuple of sampling values P;

diagnosing a misfire condition if the diagnosing function is outside the threshold t.

6. The diagnostic method according to claim 1, wherein the threshold t is determined in dependence of engine speed and/or engine load.

7. The diagnostic method according to claim 1, wherein selected number ($P\alpha$, $P\beta$) of subsequent sampling pressure values are selected in dependence of cylinder position and/or engine speed and/or engine load.

8. The diagnostic method according to claim 1, wherein the error function is a sum of tested false positives and false negatives in a specified engine speed range interval in a calibration set of verified positive or negative fire events.

9. The diagnostic method according to claim 8, wherein the calibration set is provided in dependency of an injected fuel quantity, engine speed or engine load.

10. The diagnostic method of claim 1, wherein the engine speed rlow is at least lower than 1000 rpm in the engine speed range interval.

11. The diagnostic method according to claim 1, wherein the pressure sensor is arranged in a common exhaust path of the at least first and second cylinders.

12. The diagnostic method according to claim 1, wherein the pressure sensor is a ceramic capacitive sensor.

13. The diagnostic method according to claim 1, wherein the crankshaft angle detector comprises a flywheel having detector markings spaced at regular angles, wherein the passing of a marking is associated with passing of a crankshaft angle.

14. The diagnostic method according to claim 1, further comprising a camshaft angle detector, wherein the camshaft angle position is combined with the crankshaft, to identify a firing cylinder.

15. The diagnostic method according to claim 1, further comprising a cut off filter, that removes high frequency components of the pressure sensor signal.

16. The diagnostic method according to claim 1, wherein the number of subsequent sampling pressure values are selected as a function of crankshaft speed, wherein, with increasing crankshaft speed, the sample value is shifted to an increased crankshaft angle position.

17. The diagnostic method according to claim 1 wherein the the number of subsequent sampling pressure values are selected as a function of engine load.

18. The diagnostic method according to claim 1, wherein the number of subsequent sampling pressure values are selected as a function of cylinder position, relative to the pressure sensor.

19. The diagnostic method according to claim 1, wherein a pressure pulse is sampled for more than nine subsequent pressure values over a crankshaft rotation of about 270 degrees crank angle.

20. A diagnostic method for diagnosing a misfire condition of individual engine cylinders in a turbocharged diesel engine having at least a first and a second cylinder, further comprising:
one or more pressure sensors for measuring a pressure value in an exhaust path of the at least first and second cylinder;
a crankshaft position sensor, for detecting a rotational crankshaft position; and
a processor unit for reading the pressure sensor and the crankshaft position sensor;
wherein the processor unit is arranged for performing acts of:
obtaining a number of subsequent sampling pressure values (p1 ... pm) of the pressure sensor as a function of crankshaft angle position;
diagnosing a misfire condition based on the obtained sampling pressure values; wherein the diagnosing is carried out by a diagnosing function formed by at least two characteristics ($c_i$, $c_j$) from a set of basic functions (c1,cl) on selected number of sampling values ($P_\alpha$, $P_\beta$) of the tuple P of sampling values for at least two successive crankshaft angle positions of a pressure pulse during a cylinder firing operation, said basic functions including at least two of
a single sample characteristic (c1)
a delta pressure characteristic (c2) between subsequent samples
a mean pressure characteristic (c3) over subsequent samples
a variance characteristic (c4) over subsequent samples
a slope characteristic (c5) of a linear fit over subsequent samples
an intercept characteristic (c6) of a linear fit over subsequent samples
a delta characteristic (c7) between subsequent mean pressure values.

21. The diagnostic method according to claim 20, further including
determining a threshold characteristic from a calibration set, for said diagnosing function ($c_i$, $c_j$) formed by a tuple C of basic function values (c1, ... , cl) on the tuple of sampling values P; and diagnosing a misfire condition if the diagnosing function is outside the threshold characteristic.

22. The diagnostic method according to claim 20, wherein said diagnosing function is selected by a method comprising:
defining a group of diagnosing functions (f1 ... fn), each having as inputs a selected number ($P_\alpha$, $P_\beta$) of subsequent sampling pressure values of a tuple P (p1 ... pm) and having an output diagnosing a misfire condition when the diagnosing function (f1 ... fn) is outside a threshold (t1 ... tn);
determining an error function (e1 ... en) which is a function of measured false fails and false passes for said diagnosed misfire condition by said diagnosing function (f1 ... fn), in each of an engine speed region, ranging from a lowest engine speed (rlow) to a highest engine speed (rhigh), for selected engine speed range intervals (s1 ... sl), and
selection a diagnosing function fi from the group of diagnosing functions (f1 ... fn), wherein fi having an error function ci that is lowest over the entire speed mange ([rlow-rhigh]).

23. The diagnostic method according to claim 20, wherein the threshold is determined in dependence of engine speed.

24. The diagnostic method according to claim 20, wherein selected number ($P\alpha$, $P\beta$) of subsequent sampling pressure values are selected in dependence of cylinder and engine speed.

* * * * *